US012330977B2

(12) United States Patent
Lee et al.

(10) Patent No.: US 12,330,977 B2
(45) Date of Patent: Jun. 17, 2025

(54) THIN GLASS PLATE PROCESSING APPARATUS AND METHOD

(71) Applicant: HANA TECHNOLOGY CO., LTD., Yongin-si (KR)

(72) Inventors: Chang Seock Lee, Cheonan-si (KR); Kyoung Ho Choi, Goyang-si (KR)

(73) Assignee: HANA TECHNOLOGY CO., LTD., Yongin-si (KR)

( * ) Notice: Subject to any disclaimer, the term of this patent is extended or adjusted under 35 U.S.C. 154(b) by 181 days.

(21) Appl. No.: 18/319,102

(22) Filed: May 17, 2023

(65) Prior Publication Data
US 2024/0317626 A1 Sep. 26, 2024

(30) Foreign Application Priority Data

Mar. 21, 2023 (KR) .......................... 10-2023-0036511

(51) Int. Cl.
*C03B 23/02* (2006.01)
*B24B 9/10* (2006.01)
*B24B 49/12* (2006.01)
(52) U.S. Cl.
CPC ................ *C03B 23/02* (2013.01); *B24B 9/10* (2013.01); *B24B 49/12* (2013.01)
(58) Field of Classification Search
CPC .. B24B 7/24; B24B 7/242; B24B 9/08; B24B 9/10; B24B 9/105; B24B 27/003; B24B 27/0046; B24B 49/12; B24B 49/14

USPC ...................... 451/44, 11, 342, 5, 8, 362, 41
See application file for complete search history.

(56) References Cited

U.S. PATENT DOCUMENTS 9,199,355 B2 * 12/2015 Lee ............................ B24B 9/10
9,957,188 B2 * 5/2018 Kwon ...................... C03B 33/09

FOREIGN PATENT DOCUMENTS

KR 10-2003-0054720 A 7/2003
KR 20150144534 A * 12/2015 ............... B24B 9/10

OTHER PUBLICATIONS

Machine translation of KR-20150144534-A (Year: 2015).*

* cited by examiner

*Primary Examiner* — Robert F Neibaur
(74) *Attorney, Agent, or Firm* — Bridgeway IP Law Group, PLLC; Jihun Kim

(57) ABSTRACT

Proposed is a thin glass plate processing apparatus and method. More particularly, proposed is a thin glass plate processing apparatus and method, in which at least a side of a heating part presses a glass plate on a jig with a substantially uniform pressure along a processing orthogonal direction, thereby constantly controlling the amount of glass removed during a heat chamfering process of the glass plate, and at the same time, the center of the jig is accurately measured when setting a processing path of the heating part, thereby precisely setting the processing path.

12 Claims, 15 Drawing Sheets

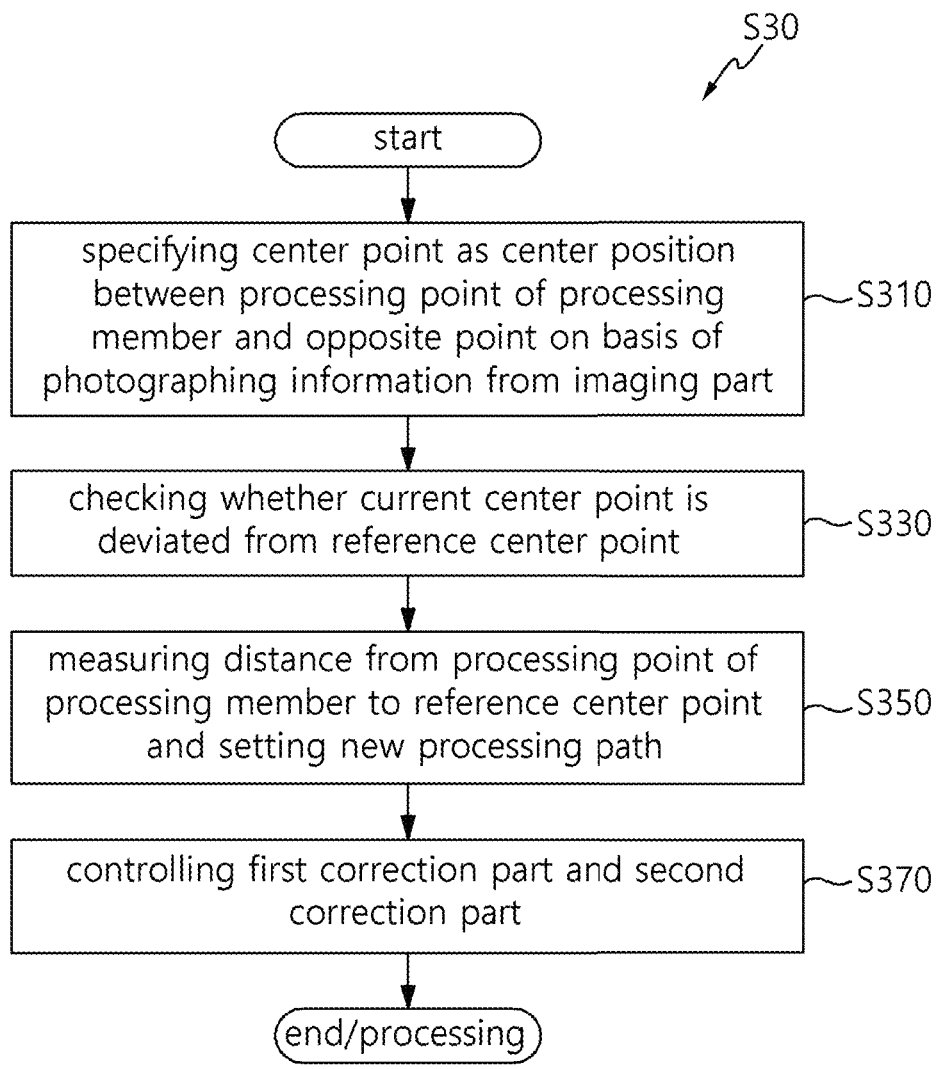

THIN GLASS PLATE PROCESSING APPARATUS AND METHOD

CROSS REFERENCE TO RELATED APPLICATION

The present application claims priority to Korean Patent Application No. 10-2023-0036511, filed Mar. 21, 2023, the entire contents of which is incorporated herein for all purposes by this reference.

BACKGROUND OF THE INVENTION

Field of the Invention

The present disclosure relates generally to a thin glass plate processing apparatus and method. More particularly, the present disclosure relates to a thin glass plate processing apparatus and method, in which at least a side of a heating part presses a glass plate on a jig with a substantially uniform pressure along a processing orthogonal direction, thereby constantly controlling the amount of glass removed during a heat chamfering process of the glass plate, and at the same time, the center of the jig is accurately measured when setting a processing path of the heating part, thereby precisely setting the processing path.

Description of the Related Art

Recently, mobile products such as smartphones and tablet PCs have been released with various designs and functions to meet the needs of consumers. As displays for such mobile products, liquid crystal displays, LED panels, OLED panels, touch panels, etc. are mainly used. For the purpose of protecting the surface of the display, glass for screen protection is used. The glass is cut using a laser, scriber, water jet, etc. according to the size of the display to be applied, and undergoes a surface treatment process and a strengthening process. The surface treatment process and the strengthening process of the glass are necessarily accompanied by a processing process of the cut surface in order to prevent the glass from being broken, that is, to increase roughness. As an example of the processing process, a technique of cutting the corners of a glass substrate by bringing a high-frequency induction heating member into contact with the glass substrate has been used.

FIG. 1 is a reference view illustrating a misalignment state of a glass plate during a processing operation using a conventional high-frequency induction heating member; FIGS. 2A, 2B, and 2C are reference views illustrating a misalignment state of the high-frequency induction heating member during the processing operation using the conventional high-frequency induction heating member; and FIG. 3 is a reference view illustrating the occurrence of defects in the glass plate during the processing operation using the conventional high-frequency induction heating member.

Hereinafter, the problems of processing technology using the conventional high-frequency induction heating member will be described in detail with reference to the accompanying drawings.

Referring to FIG. 1, when processing a glass plate 3 by a conventional thin glass plate processing apparatus 9, the glass plate 3 may be tilted on a jig 5 due to continuous contact between a heating rod 910 and the glass plate 3 or external factors. In this state, when the heating rod 910 performs a heat chamfering process on the glass plate 3 along a preset processing path, it is difficult to constantly control the amount of glass removed from the glass plate 3 since the heating rod 910 may fail to make contact with the glass plate 3 with a uniform pressure depending on its position. This may become a cause of processing defects of the glass plate 3.

Referring to FIGS. 2A, 2B, and 2C, when processing the glass plate 3 by the conventional thin glass plate processing apparatus 9, the heating rod 910 may be tilted in the x-axis and/or y-axis direction due to its twisting, etc. (see FIG. 2A), or the heating rod 910 may be positioned deviated from a preset point (see FIG. 2B). In addition, there is a case where thermal deformation occurs in the cylindrical heating rod 910 and the cross-sectional shape of the heating rod 910 does not have a uniform R value (distortion, etc.), and this may become a cause of a change in the position of the center point of a side cross-section of the heating rod 910 (see FIG. 2C).

Referring to FIG. 3, when processing or heat chamfering is performed in the above-described conditions, processing defects occur in a side wall portion 31 or a corner portion 33 of the glass plate 3. In particular, the corner portion 33 may be formed non-uniformly as the R value of a processed round shape is out of an error range. This may become a major cause of product defects.

In order to solve the above problems, the inventors of the present disclosure have proposed a novel thin glass plate processing apparatus and method having an improved structure, which will be described in detail later.

The foregoing is intended merely to aid in the understanding of the background of the present disclosure, and is not intended to mean that the present disclosure falls within the purview of the related art that is already known to those skilled in the art.

Documents of Related Art (Patent document 1) Korean Patent Application Publication No. 10-2003-0054720 "Apparatus for chamfering glass of flat panel display"

SUMMARY OF THE INVENTION

Accordingly, the present disclosure has been made keeping in mind the above problems occurring in the related art, and an objective of the present disclosure is to provide a thin glass plate processing apparatus and method, in which a uniform pressure control part including, for example, a VCM, is provided so that a processing member performs a processing operation in a state where an adjacent glass plate is pressed with a uniform pressure, thereby constantly controlling the amount of glass removed.

Another objective of the present disclosure is to provide a thin glass plate processing apparatus and method, in which when applying a jig center point derivation module that derives the center point of a jig by controlling a processing member to be brought into contact with a plurality of side wall portions of the jig, only a single processing point of the processing member is brought into contact with the plurality of side wall portions so that an accurate center point of the jig is derived even when thermal deformation occurs in the processing member.

Another objective of the present disclosure is to provide a thin glass plate processing apparatus and method, in which when a processing member and a plurality of side wall portions of a jig are brought into contact with each other by a jig center point derivation module, the movement of the processing member in a processing orthogonal direction is controlled by a uniform pressure control part so that the center point of the jig is easily derived.

Another objective of the present disclosure is to provide a thin glass plate processing apparatus and method, in which when the origin point of a processing member is derived by a processing member origin point derivation module, the origin point of the processing member is derived through an imaging part by rotating the processing member by 360° step by step from an initial position so that a processing path of the processing member is precisely set.

Another objective of the present disclosure is to provide a thin glass plate processing apparatus and method, in which at least one of a processing direction and a processing orthogonal direction of a processing member is controlled so that chamfering or processing defects on the corners of a glass plate caused by twisting or positional deviation of the processing member are prevented.

Another objective of the present disclosure is to provide a thin glass plate processing apparatus and method, in which an insertion portion of each shaft member is coupled to an extension portion so as to be eccentric from the central axis of the extension portion in the z-direction so that the movement of each moving plate member in a processing direction and/or a processing orthogonal direction is easily controlled.

Another objective of the present disclosure is to provide a thin glass plate processing apparatus and method, in which an elastic means is provided on a side of each moving plate member so that the moving plate member is easily returned to an original position when moving in a processing direction and/or a processing orthogonal direction.

Another objective of the present disclosure is to provide a thin glass plate processing apparatus and method, in which a uniform pressure control part is provided so that even when a glass plate is misaligned on a jig, processing defects of the glass plate are prevented as much as possible.

Another objective of the present disclosure is to provide a thin glass plate processing apparatus and method, in which a controller specifies the center position between a processing point and an opposite point as a current center point so that even when thermal deformation occurs in a processing member and the cross-sectional shape thereof does not form a circle, an accurate center point is specified.

Another objective of the present disclosure is to provide a thin glass plate processing apparatus and method, in which a measurement module for measuring the distance from a processing point of a processing member to a previous center point and a resetting module for resetting a prestored processing path into a new processing path according to the distance are provided so that even when thermal deformation occurs in the processing member and the cross-sectional shape thereof does not form a circle, a glass plate is processed along an accurate processing path.

In order to achieve the above objectives, according to one aspect of the present disclosure, there is provided a thin glass plate processing apparatus including: a heating part configured to heat-chamfer side wall portions and/or corner portions of a glass plate on a jig as at least a side thereof is heated; a uniform pressure control part configured to move the heating part adjacent to the glass plate along a processing orthogonal direction so that the heating part heat-chamfers the side wall portions and/or the corner portions of the glass plate while pressing the side wall portions and/or the corner portions with a substantially uniform pressure; and an imaging part configured to photograph a side of a processing member. Here, the heating part may include: a body portion configured to fix the processing member to a lower side thereof; and the processing member configured to heat-chamfer the glass plate in contact with the side wall portions and/or the corner portions of the adjacent glass plate by being heated by a high-frequency induction heater.

According to another aspect of the present disclosure, the uniform pressure control part may include a VCM.

According to another aspect of the present disclosure, the thin glass plate processing apparatus may further include: a first correction part configured to align the processing member along a processing direction; and a second correction part configured to align the processing member along the processing orthogonal direction. Here, only a single processing point of the processing member may be brought into contact with the side wall portions and/or the corner portions of the glass plate.

According to another aspect of the present disclosure, the thin glass plate processing apparatus may further include a processing path setting part configured to set a processing path of the processing member to perform heat chamfering on the glass plate on the jig. Here, the processing path setting part may include: a jig center point derivation module configured to derive a center point of the jig by controlling the processing member to be brought into contact with a plurality of side wall portions of the jig; a processing member origin point derivation module configured to derive an origin point of the processing member; and a path setting module configured to set the processing path of the processing member.

According to another aspect of the present disclosure, the thin glass plate processing apparatus may further include a detection part configured to detect contact positions of the processing member and the plurality of side wall portions of the jig. Here, the jig center point derivation module may derive an x coordinate value and a y coordinate value of the center point of the jig by controlling the processing member to be brought into contact with four side wall portions of the jig having a substantially rectangular plate shape.

According to another aspect of the present disclosure, the jig center point derivation module may control only the single processing point of the processing member to be brought into contact with the side wall portions of the jig.

According to another aspect of the present disclosure, the processing member origin point derivation module may derive the origin point of the processing member by rotating the processing member by 360° step by step from an initial position of the processing member and deriving a center point of a circle circumscribed with the processing member at a position corresponding to each step.

According to another aspect of the present disclosure, the thin glass plate processing apparatus may further include a processing path correction part configured to correct the processing path of the processing member by controlling the first correction part and/or the second correction part. Here, the processing path correction part may include a first control module configured to control driving of the first correction part by analyzing a position of the processing member in the processing direction on the basis of photographing information from the imaging part, and the first control module may include: a first analysis module configured to derive a distance between a prestored reference center point and a current center point of the processing member in the processing direction; and a first driving module configured to controlling driving of the first correction part on the basis of the distance derived by the first analysis module.

According to another aspect of the present disclosure, the current center point may be derived as a center position between the processing point of the processing member and a point opposite to the processing point.

According to another aspect of the present disclosure, the processing path correction part may include a second control module configured to control driving of the second correction part by analyzing a position of the processing member in the processing orthogonal direction on the basis of the photographing information from the imaging part, and the second control module may include: a second analysis module configured to derive a distance between the pre-stored reference center point and the current center point of the processing member in the processing orthogonal direction; and a second driving module configured to controlling driving of the second correction part on the basis of the distance derived by the second analysis module.

According to another aspect of the present disclosure, the second control module may further include: a measurement module configured to measure a distance from the processing point of the processing member to the reference center point; and a resetting module configured to reset a prestored processing path into a new processing path on the basis of the distance measured by the measurement module.

According to another aspect of the present disclosure, the processing path correction part may further include a processing point change module configured to change a previous processing point to a new processing point when the processing point of the processing member is worn or damaged due to a plurality of processing operations, and the new processing point may be set through height adjustment and/or lateral rotation of the processing member.

According to another aspect of the present disclosure, the first correction part may include: a first shaft member having a first end connected to a first driving means and a second end inserted into a first moving plate member; the first moving plate member configured to allow the second end of the first shaft member to be inserted therein and to be moved in the processing direction; and the first driving means connected to the first end of the first shaft member and configured to control rotation of the first shaft member. The first shaft member may include: a first extension portion connected to the first driving means and extending downward; and a first insertion portion inserted into the first moving plate member. The first insertion portion may be coupled to a lower portion of the first extension portion so as to be eccentric from a central axis of the first extension portion in a z-axis direction. The first moving plate member may include a first insertion groove allowing the first insertion portion to be inserted therein.

According to another aspect of the present disclosure, there is provided a thin glass plate processing method using a thin glass plate processing apparatus, the thin glass plate processing apparatus including: a processing member configured to process side wall portions and/or corner portions of an adjacent glass plate by being heated by power supply; a heat transfer part configured to provide heat to the processing member; and a uniform pressure control part configured to move the processing member adjacent to the glass plate along a processing orthogonal direction so that the processing member heat-chamfers the side wall portions and/or the corner portions of the glass plate while pressing the side wall portions and/or the corner portions with a substantially uniform pressure, the thin glass plate processing method including setting a processing path of the processing member. Here, the setting of the processing path may include: deriving coordinate values of a center point of a jig on which the glass plate is to be placed; deriving coordinate values of an origin point of the processing member; and setting the processing path of the processing member on the basis of the coordinate values of the center point of the jig and the coordinate values of the origin point of the processing member.

According to another aspect of the present disclosure, the deriving of the coordinate values of the center point of the jig may include deriving the coordinate values of the center point of the jig on the basis of coordinate values of contact positions detected by a detection part when the processing member is brought into contact with a plurality of side wall portions of the jig by driving of the uniform pressure control part, and the deriving of the coordinate values of the origin point of the processing member may include driving the coordinate values of the origin point of the processing member by rotating the processing member by 360° step by step from an initial position of the processing member and deriving a center point of a circle circumscribed with the processing member at a position corresponding to each step.

The present disclosure has the following effects by the above configuration.

According to the present disclosure, by providing the uniform pressure control part including, for example, a VCM, the processing member can perform the processing operation in a state where the adjacent glass plate is pressed with a uniform pressure, thereby constantly controlling the amount of glass removed.

In addition, when applying the jig center point derivation module that derives the center point of the jig by controlling the processing member to be brought into contact with the plurality of side wall portions of the jig, by allowing only a single processing point of the processing member to be brought into contact with the plurality of side wall portions, an accurate center point of the jig can be derived even when thermal deformation occurs in the processing member.

In addition, when the processing member and the side wall portions of the jig are brought into contact with each other by the jig center point derivation module, by controlling the movement of the processing member in the processing orthogonal direction by the uniform pressure control part, the center point of the jig can be easily derived.

In addition, when the origin point of the processing member is derived by the processing member origin point derivation module, by deriving the origin point of the processing member through the imaging part by rotating the processing member by 360° step by step from the initial position, the processing path of the processing member can be precisely set.

In addition, by controlling at least one of the processing direction and the processing orthogonal direction of the processing member, chamfering or processing defects on the corners of the glass plate caused by twisting or positional deviation of the processing member can be prevented.

In addition, by coupling the insertion portion of each shaft member to the extension portion so as to be eccentric from the central axis of the extension portion in the z-direction, the movement of each moving plate member in the processing direction and/or the processing orthogonal direction can be easily controlled.

In addition, by providing the elastic means on the side of each moving plate member, the moving plate member can be easily returned to the original position when moving in the processing direction and/or the processing orthogonal direction.

In addition, by providing the uniform pressure control part, even when the glass plate is misaligned on the jig, processing defects of the glass plate can be prevented as much as possible.

In addition, by specifying the center position between the processing point and the opposite point as the current center point by the controller, even when thermal deformation occurs in the processing member and the cross-sectional shape thereof does not form a circle, an accurate center point can be specified.

In addition, by providing the measurement module for measuring the distance from the processing point of the processing member to the previous center point and the resetting module for resetting the prestored processing path into the new processing path according to the distance, even when thermal deformation occurs in the processing member and the cross-sectional shape thereof does not form a circle, the glass plate can be processed along an accurate processing path.

Meanwhile, the effects of the present disclosure are not limited to the above-mentioned effects, and other effects not mentioned above can be clearly understood from the following description.

BRIEF DESCRIPTION OF THE DRAWINGS

The above and other objectives, features, and other advantages of the present disclosure will be more clearly understood from the following detailed description when taken in conjunction with the accompanying drawings, in which:

FIG. 15 is a flowchart illustrating step S30 illustrated in FIG. 13.

DETAILED DESCRIPTION OF THE INVENTION

Figure 1:
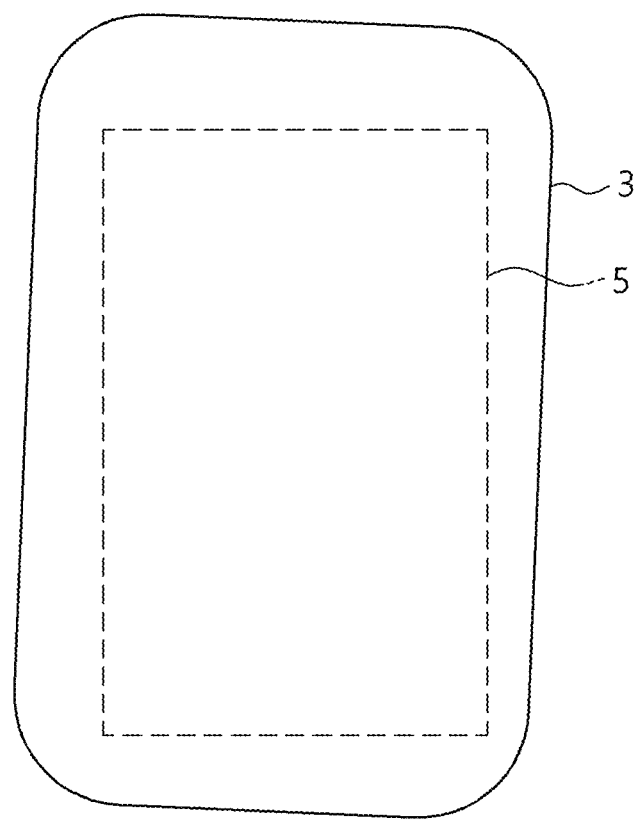
FIG. 1 is a reference view illustrating a misalignment state of a glass plate during a processing operation using a conventional high-frequency induction heating member.

Hereinafter, exemplary embodiments of the present disclosure will be described in more detail with reference to the accompanying drawings. The embodiments of the present disclosure can be modified in various forms. Therefore, the scope of the present disclosure should not be construed as being limited to the following embodiments, but should be construed on the basis of the descriptions in the appended claims. The embodiments of the present disclosure are provided for complete disclosure of the present disclosure and to fully convey the scope of the present disclosure to those ordinarily skilled in the art.

As used herein, the singular forms "a", "an", and "the" are intended to include the plural forms as well, unless the context clearly indicates otherwise. The terms "comprise" and/or "comprising" means inclusion of a shape, number, process, operations, member, element, and/or a group of those, but do not mean exclusion of or denial of addition of another shape, number, process, operation, element, and/or a group of those.

As used herein, when an element (or layer) is referred to as being disposed on another element (or layer), it can be disposed directly on the other element, or intervening element(s) (or layer(s)) may be disposed therebetween. In contrast, when an element is referred to as being directly disposed on or above another element, intervening element(s) are not located therebetween. Further, the terms "on", "above", "below", "upper", "lower", "one side", "side surface", etc. are used to describe one element's relationship to another element illustrated in the drawings.

It will be understood that when an element is referred to as being "coupled" or "connected" to another element, it can be directly coupled or connected to the other element or intervening elements may be present therebetween.

It will be further understood that a "processing direction" refers to a direction in which a glass substrate is processed by a thin glass plate processing apparatus 1, and a "processing orthogonal direction" refers to a direction orthogonal to the processing direction on a horizontal plane. In addition, when processing, for example, a substantially rectangular shaped glass plate, it should be noted that the direction in which processing proceeds along an extension direction of each side wall portion is set as a processing direction and the corresponding processing direction may be a variable direction. That is, the "processing direction" may be an x-axis direction when processing is performed along a first side wall portion of the glass plate, and may be a y-axis direction when processing is performed along a second side wall portion through the first side wall portion and a corner portion. Accordingly, the "processing direction" may refer to a moving direction of a processing member, which will be described later. In addition, it will be understood that the "processing orthogonal direction" refers to a direction approaching or moving away from the glass plate on a jig.

Further, although the terms "first", "second", etc. may be used herein to describe various elements, these elements should not be limited by these terms. These terms are only used to distinguish one element from another element.

The thin glass plate processing apparatus 1 according to an embodiment of the present disclosure is applicable not only to displays for mobile products, but also to displays for vehicles and displays for wearable devices, as well as various arbitrary technical fields. It should be however noted that the application range thereof is not limited thereto.

Hereinafter, the thin glass plate processing apparatus 1 according to the embodiment of the present disclosure will be described in detail with reference to the accompanying drawings.

A glass plate (or glass) 3 may be, for example, ultra thin glass (UTG) or glass thin film, but is not limited thereto. The glass plate 3 may have, for example, a substantially rectangular plate shape and may have four side wall portions 31 extending in a substantially straight line and a corner portion 33 where each pair of side wall portions 31 meet each other. Each corner portion 33 may be processed by the thin glass plate processing apparatus 1 or formed into a rounded shape before processing. Here, it should be noted that the processed shape of the glass plate 3 may be arbitrary and may be circular or polygonal as another example. However, the scope of the present disclosure is not limited to the above examples. The glass plate 3 may be placed on a jig 5 having a substantially flat upper surface during a heat chamfering process.

In addition, the glass plate 3 placed on the jig 5 immediately before being processed by the thin glass plate processing apparatus 1 is preferably at room temperature of about 18° C. to 27° C., more preferably within 20° C. to 25° C. However, the scope of the present disclosure is not limited to the above numerical ranges. For example, it should be noted that the glass plate 3 may be maintained at equal to or less than 18° C. on the jig 5.

Figure 4:
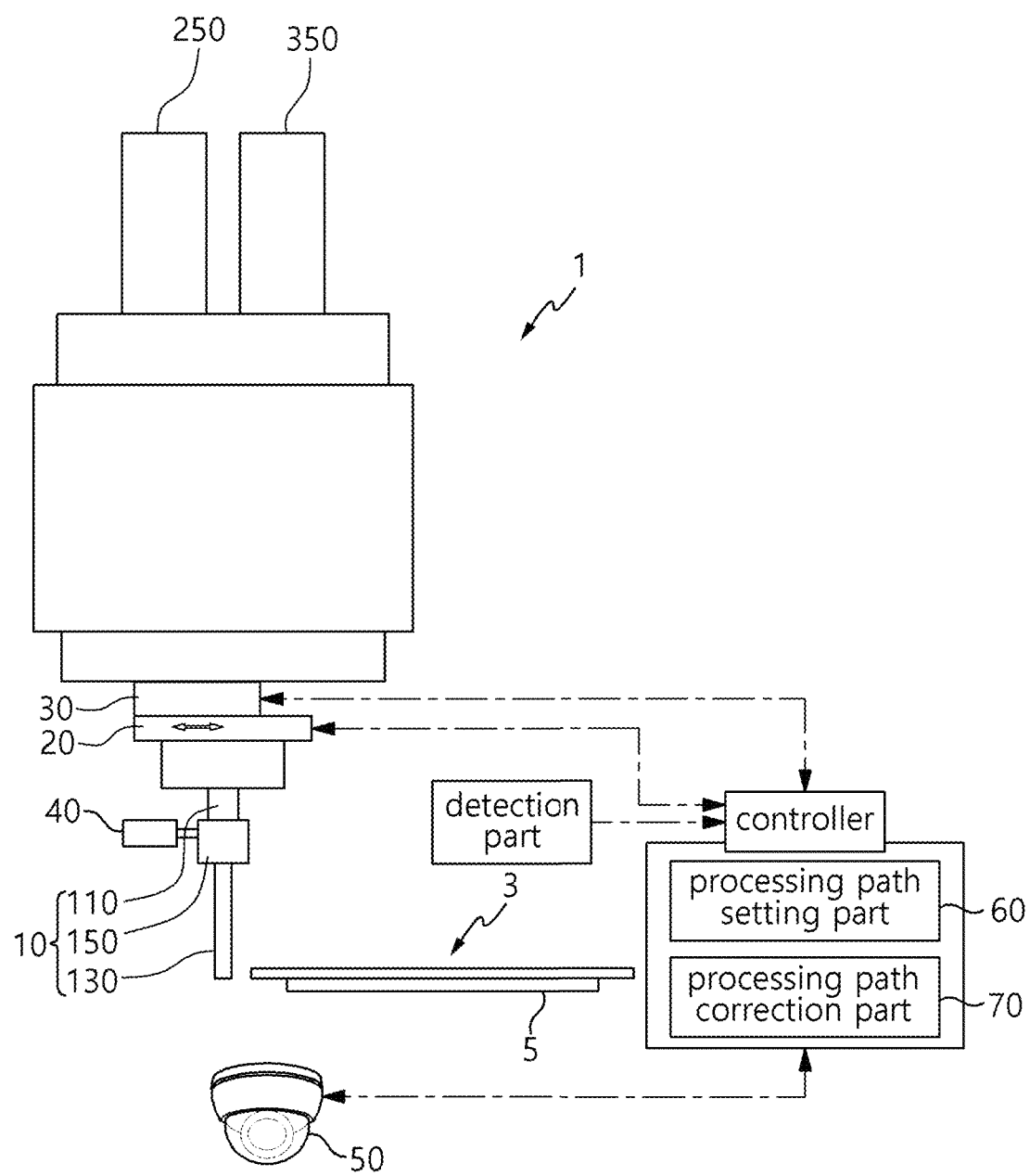
FIG. 4 is a conceptual view illustrating a thin glass plate processing apparatus according to an embodiment of the present disclosure.

FIG. 4 is a conceptual view illustrating the thin glass plate processing apparatus 1 according to the embodiment of the present disclosure.

Referring to FIG. 4, the present disclosure relates to the thin glass plate processing apparatus 1. More particularly, the present disclosure relates to the thin glass plate processing apparatus 1, in which at least a side of a heating part 10 presses the glass plate 3 on the jig 5 with a substantially uniform pressure along the processing orthogonal direction, thereby constantly controlling the amount of glass removed during the heat chamfering process of the glass plate 3, and at the same time, the center of the jig 5 is accurately measured when setting a processing path of the heating part 10, thereby precisely setting the processing path.

To this end, the thin glass plate processing apparatus 1 may include the heating part 10, a first correction part 20, a second correction part 30, a uniform pressure control part 40, an imaging part 50, a processing path setting part 60, a processing path correction part 70, and a detection part 80. The processing path setting part 60 and the processing path correction part 70 may be, for example, software and/or hardware integrally formed in a "controller", but is not limited thereto.

The heating part 10 may process or chamfer the side wall portions 31 and/or the corner portions 33 of the adjacent glass plate 3 as at least a side thereof is heated. In addition, the heating part 10 may be mechanically connected to the first correction part 20 and/or the second correction part 30, which will be described later. The heating part 10 may locally apply heat to a side of the glass plate 3 to be chamfered by a thermal processing method so that glass is separated from the glass plate 3 by itself.

To this end, the heating part 10 may include a body portion 110, a processing member 130, and a heat transfer portion 150.

The body portion 110 may be fix the processing member 130 to a side thereof, preferably to a lower side thereof. The body portion 110 may be formed, for example, in a rod shape, but is not limited thereto.

The processing member 130 may be heated by power supply to process or chamfer the side wall portions 31 and/or the corner portions 33 of the adjacent glass plate 3. A tip of the processing member 130 may be made of, for example, a ceramic material, but is not limited thereto. When the processing member 130 is formed in a rod shape, it is preferable that only one point of the processing member 130 is brought into contact with the side wall portions 31 and/or the corner portions 33 in the process of processing the side wall portions 31 and/or the corner portions 33 of the glass plate 3. That is, only one point of an outer circumferential surface of the processing member 13 may be brought into contact with the glass plate. The "one point" is hereinafter referred to as a "processing point C".

In addition, for example, the processing member 130 may perform processing after matching a center point P1 of the cross-section thereof (e.g., horizontal cross-section) with a reference center point P2 preset and stored in the controller. This may proceed through the first correction part 20 and/or the second correction part 30, which will be described later, under control of the controller. Here, "matching" between the center points P1 and P2 may mean that the center points P1 and P2 are located within a preset distance error range or x and y coordinate values between the center points P1 and P2 are within a preset error range.

The heat transfer portion 150 may provide heat to the processing member 130. For example, the heat transfer portion 150 may be positioned on an outer surface or the outer circumferential surface of the processing member 130, and may be heated by a high-frequency induction heater (not illustrated) to provide heat to the processing member 130. To this end, the processing member 130 may be disposed to pass through the heat transfer portion 150 configured as an induction coil. However, it is sufficient that the heat transfer portion 150 is a configuration capable of providing heat to the processing member 130 other than the induction coil.

Figure 2A:
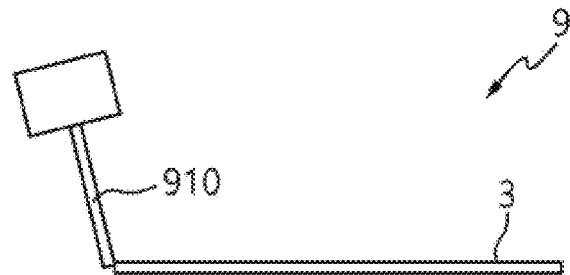
FIGS. 2A, 2B, and 2C are reference views illustrating a misalignment state of the high-frequency induction heating member during the processing operation using the conventional high-frequency induction heating member.
Figure 2B:
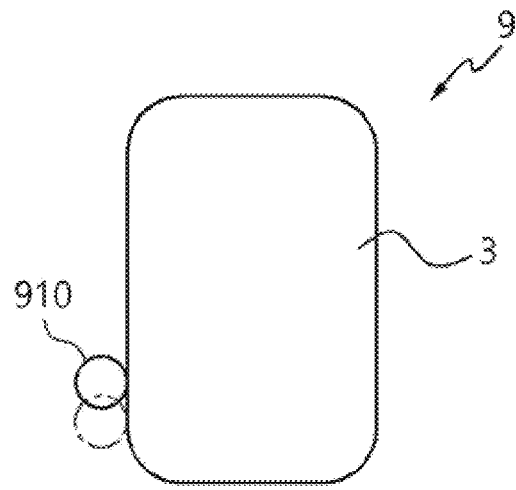
Figure 2C:
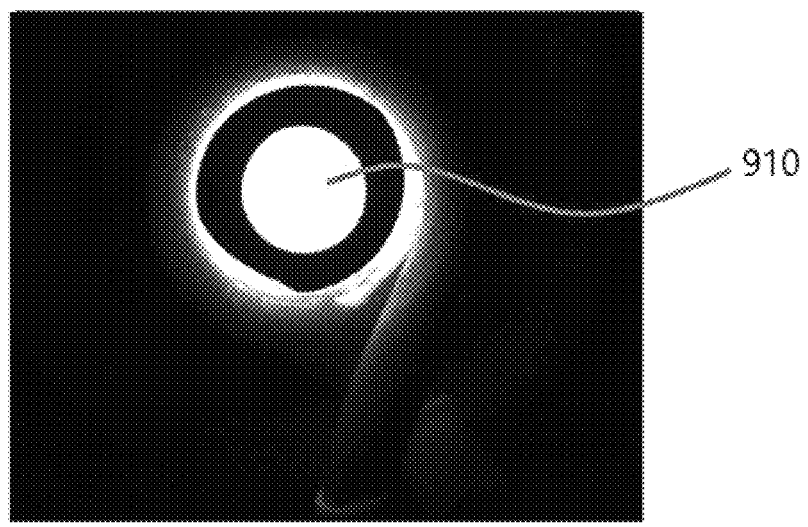
Figure 3:
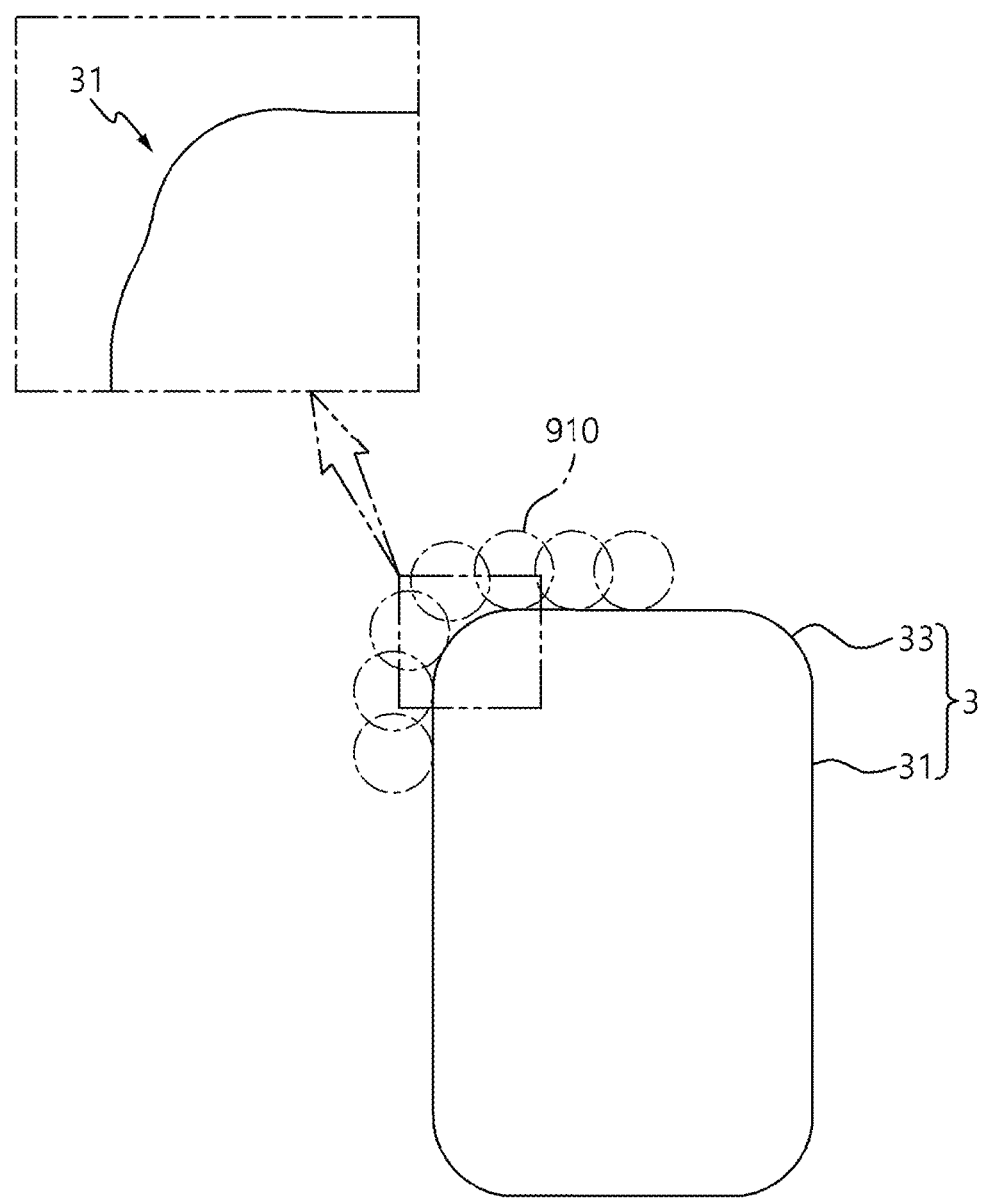
FIG. 3 is a reference view illustrating the occurrence of defects in the glass plate during the processing operation using the conventional high-frequency induction heating member.

Referring to FIGS. 1 to 3, when processing a glass plate 3 by a conventional glass plate processing apparatus 9, the glass plate 3 may be tilted on a jig 5 due to continuous contact between a heating rod 910 and the glass plate 3 or external factors. In this state, when the heating rod 910 performs a heat chamfering process on the glass plate 3 along a preset processing path, it is difficult to constantly control the amount of glass removed from the glass plate 3 since the heating rod 910 may fail to make contact with the glass plate 3 with a uniform pressure depending on its position. This may become a cause of processing defects of the glass plate 3.

In addition, when processing the glass plate 3 by the conventional glass plate processing apparatus 9, the heating rod 910 may be tilted in the processing direction and or the processing orthogonal direction due to its twisting, etc., or the heating rod 910 may be positioned deviated from a preset point. For example, after the heating rod 910 is brought into contact with the glass plate 3, the heating rod 910 may be deviated from an original position due to a repulsive force.

In addition, the cylindrical heating rod 910 may be thermally deformed during heating, so the cross-sectional shape thereof may not have a uniform R value. That is, the heating rod 910 may have a distorted shape at least locally. Due to these various reasons, when a processing or chamfering operation is performed in a state where the center point P1 of the cross-section of the heating rod 910 does not coincide with the reference center point P2, processing defects inevitably occur in a side wall portion 31 and/or a corner portion 33 of the glass plate 3.

In particular, the corner portion 33 may be formed non-uniformly as the R value of a processed round shape is out of an error range. In other words, when heat-chamfering the corner portion 33 of the glass plate 3 along an existing set path in a state where the diameter size of the heating rod 910 in the processing direction and/or the processing orthogonal direction becomes smaller than the original diameter size thereof due to thermal deformation of the heating rod 910, the position where the deformed heating rod 910 makes a turn at the corner portion 33 may be changed, causing chamfering defects. That is, an outer circumferential surface of the heating rod 910 and the glass plate 3 do not properly make contact with each other. In particular, the heating rod 910 is pressed in the processing orthogonal direction through the uniform pressure control part 40, which will be described later, but there is no separate position correcting configuration along the processing direction. As a result, the above problem may become more serious.

In order to solve the problem in the related art, the thin glass plate processing apparatus 1 according to the embodiment of the present disclosure is characterized by including the first correction part 20 and the second correction part 30, and will be described in detail below.

Figure 5:
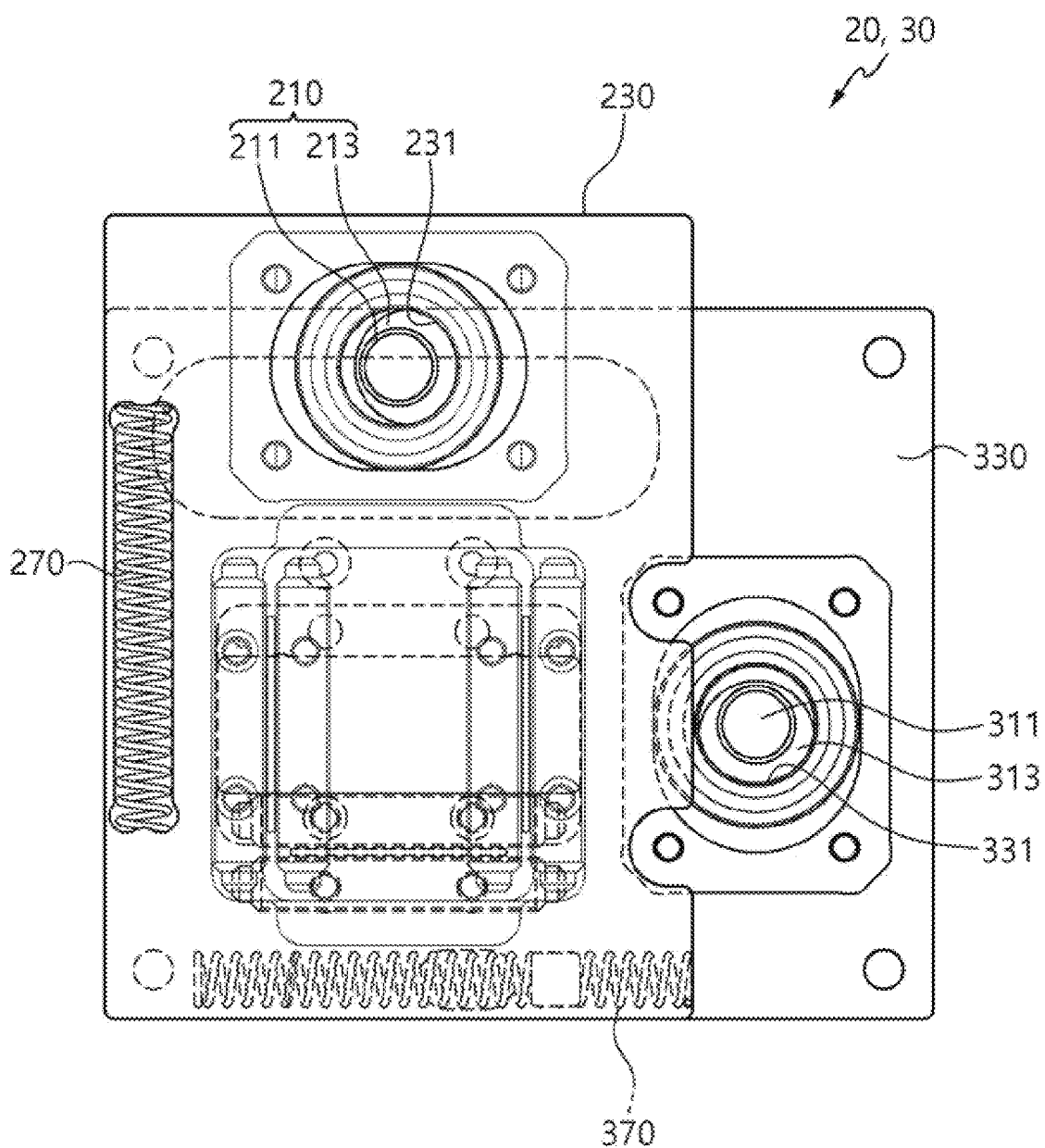
FIG. 5 is a reference view illustrating a first correction part and a second correction part according to an embodiment of the present disclosure.

FIG. 5 is a reference view illustrating the first correction part 20 and the second correction part 30 according to an embodiment of the present disclosure.

Referring to FIGS. 4 and 5, the first correction part 20 may align the heating part 10, particularly the processing member 130 along the processing direction. For example, the first correction part 20 may match a processing direction coordinate value of the processing member 130 to a processing direction coordinate value of the reference center point P2 within an error range under control of the controller. Here, it should be noted that the "processing direction coordinate value" may be a y-axis coordinate value, but may be an x-axis coordinate value depending on the position of the processing member 130. That is, the "processing direction coordinate value" may be a one-dimensional coordinate value for a current moving direction of the processing member 130.

To this end, the first correction part 20 may include a first shaft member 210, a first moving plate member 230, a first driving means 250, and a first elastic means 270.

The first shaft member 210 may have a first end connected to the first driving means 250 and a second end inserted into a side of the first moving plate member 230. The first shaft member 210 may include: a first extension portion 211 connected to the first driving means 250 and extending downward; and a first insertion portion 213 inserted into a first insertion groove 231 of the first moving plate member 230. The first insertion portion 213 may be coupled to a lower portion of the first extension portion 211. For example, the first insertion portion 213 may be coupled so as to be eccentric from the central axis of the first extension portion 211 in the z-axis direction (or vertical direction).

Thus, the first shaft member 210 may be rotated when the first driving means 250 is driven to move the first moving plate member 230 in the processing direction. In detail, when the first extension portion 211 is rotated in response to the driving of the first driving means 250 which will be described later, the first insertion portion 213 eccentrically coupled to the first extension portion 211 may control displacement of the first moving plate member 230 in the processing direction while being rotated in the first insertion groove 231. At least a side of an outer surface or an outer circumferential surface of the first insertion portion 213 may be formed in a size that is in partial contact with an inner surface or an inner circumferential surface of the first insertion groove 231. That is, the first insertion groove 231 is preferably formed to have a larger area than the first insertion portion 213. For example, the maximum width of the first insertion portion 213 may be smaller than the diameter of the first insertion groove 213. For example, the outer surface or outer circumferential surface of the first insertion portion 213 may have a side of which the diameter is not constant along a circumferential direction.

The first moving plate member 230 may be moved in the processing direction by allowing the first shaft member 210 to be inserted to the side thereof. As described above, the first moving plate member 230 may include the first insertion groove 231 recessed on a surface thereof facing the first insertion portion 213. The first insertion groove 231 may be directly formed on the first moving plate member 230 or may be indirectly formed on a side of the first moving plate member 230 by a separate element. However, the scope of the present disclosure is not limited thereto. In addition, the first insertion groove 231 may have a substantially circular planar shape, and may have a diameter equal to or greater than the maximum diameter of the first insertion portion 213.

The first driving means 250 may be connected to the first end of the first shaft member 210 to rotate the first shaft member 210. The first driving means 250 may be, for example, a motor, but the scope of the present disclosure is not limited thereto, and may be any of a variety of known or future driving devices.

The first elastic means 270 may provide a restoring force so that the first moving plate member 230 is pressed when moving from an original position in the processing direction and easily returns to the original position. The first elastic means 270 may be, for example, a spring member disposed long in the processing direction.

The second correction part 30 may align the heating part 10, particularly the processing member 130 along the processing orthogonal direction. For example, the second correction part 30 may match a processing orthogonal direction coordinate value of the processing member 130 to a processing orthogonal direction coordinate value of the reference center point P2 within an error range. That is, the second correction part 30 may control the processing member 130 to move adjacent to or away from the side wall portions 31 and/or the corner portions 33 of the adjacent glass plate 3.

To this end, the second correction part 30 may include a second shaft member 310, a second moving plate member 330, a second driving means 350, and a second elastic means 370. The second correction part 30 may be stacked on a lower side or upper side of the second correction part 20. In addition, the second correction part 30 may be formed independently of the first correction part 20 if necessary, but the scope of the present disclosure is not limited thereto.

The second shaft member 310 may have a first end connected to the second driving means 350 and a second end inserted into a side of the second moving plate member 330. The second shaft member 310 may include: a second extension portion 311 connected to the second driving means 350 and extending downward; and a second insertion portion 313 inserted into a second insertion groove 331 of the second moving plate member 330. The second insertion portion 313 may be coupled to a lower portion of the second extension portion 311. For example, the second insertion portion 313 may be coupled so as to be eccentric from the central axis of the second extension portion 311 in the z-axis direction (or vertical direction). Since the coupling relationship and shape of the second insertion portion 313 and the second insertion groove 331 remain substantially the same as those of the first insertion portion 213 and the first insertion groove 231 described above, a detailed description thereof will be omitted.

Thus, the second shaft member 310 may be rotated when the second driving means 350 is driven to move the second moving plate member 330 in the processing orthogonal direction. An outer surface or an outer circumferential surface of the second insertion portion 313 may be formed in a size that is in partial contact with an inner surface or an inner circumferential surface of the second insertion groove 331. That is, the second insertion groove 331 is preferably formed to have a larger area than the second insertion portion 313. The control of displacement of the second moving plate member 330 in the processing orthogonal direction in response to rotation of the second shaft member 310 is replaced with a description of the first shaft member 210. In addition, the second shaft member 310 is preferably formed at a position that does not interfere with the first correction part 20.

The second moving plate member 330 may be moved in the processing orthogonal direction by allowing the second shaft member 310 to be inserted to the side thereof. As described above, the second moving plate member 330 may include the second insertion groove 331 recessed on a surface thereof facing the second insertion portion 313. The second insertion groove 331 may be formed substantially the same as the first insertion groove 231. The second insertion groove 331 is preferably formed at a position that does not interfere with the first correction part 20.

The second driving means 350 may be connected to the first end of the second shaft member 310 to rotate the second shaft member 310. The second driving means 350 may be, for example, a motor, but the scope of the present disclosure is not limited thereto, and may be any of a variety of known or future driving devices.

The second elastic means 370 may provide a restoring force so that the second moving plate member 330 is pressed when moving from an original position in the processing orthogonal direction and easily returns to the original position. The second elastic means 370 may be, for example, a spring member disposed long in the processing orthogonal direction.

Referring to FIG. 4, the uniform pressure control part 40 may move the heating part 10, for example, the processing member 130 adjacent to the glass plate 3 along the processing orthogonal direction so that the processing member 130 processes or chamfers the side wall portions 31 and/or the corner portions 33 of the adjacent glass plate 3 while pressing the side wall portions 31 and/or the corner portions 33 with a substantially uniform pressure. By the uniform pressure control part 40, the processing member 130 may perform the processing operation in a state where the adjacent glass plate 3 is pressed with a substantially uniform pressure.

The uniform pressure control part 40 may include, for example, a voice coil motor (VCM), but is not limited thereto. As described above, due to uniform pressure applied through the uniform pressure control part 40, the amount of glass removed during the heat chamfering process of the glass plate 3 can be controlled to be substantially constant. In addition, even when the glass plate 3 on the jig 5 during the heat chamfering process is misaligned (positioned deviated) at a predetermined angle due to continuous contact with the heating part 10, the processing member 130 may press the glass plate 3 with a uniform pressure through the uniform pressure control part 40, so occurrence of defects due to heat chamfering can be prevented as much as possible.

The imaging part 50 may be installed on a side of the apparatus 1 to photograph the heating part 10, for example, a side of the processing member 130. Information photographed by the imaging part 50 may be transmitted to the controller. In addition, the imaging part 50 may be, for example, a vision camera, but is not limited thereto. The imaging part 50 may be, for example, disposed below the processing member 130 to photograph a lower portion of the processing member 130 or disposed laterally to the processing member 130 to photograph a side surface of the processing member 130. However, the scope of the present disclosure is not limited thereto. For convenience of description, the imaging part 50 will be hereinafter described as being disposed below the processing member 130.

Figure 6:
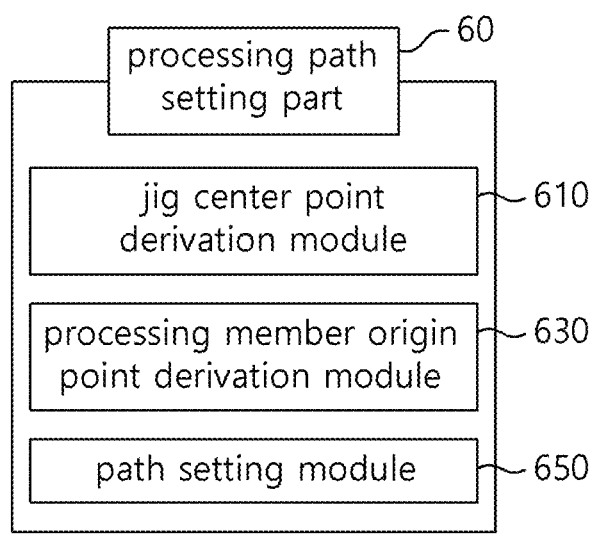
FIG. 6 is a block diagram illustrating a processing path setting part illustrated in FIG. 4.

FIG. 6 is a block diagram illustrating the processing path setting part 60 illustrated in FIG. 4.

Referring to FIGS. 4 and 6, the processing path setting part 60 may set the processing path of the processing member 130 to perform the heat chamfering process on the glass plate 3 on the jig 5. To this end, the processing path setting part 60 may include a jig center point derivation module 610, a processing member origin point derivation module 630, and a path setting module 650.

Figure 7:
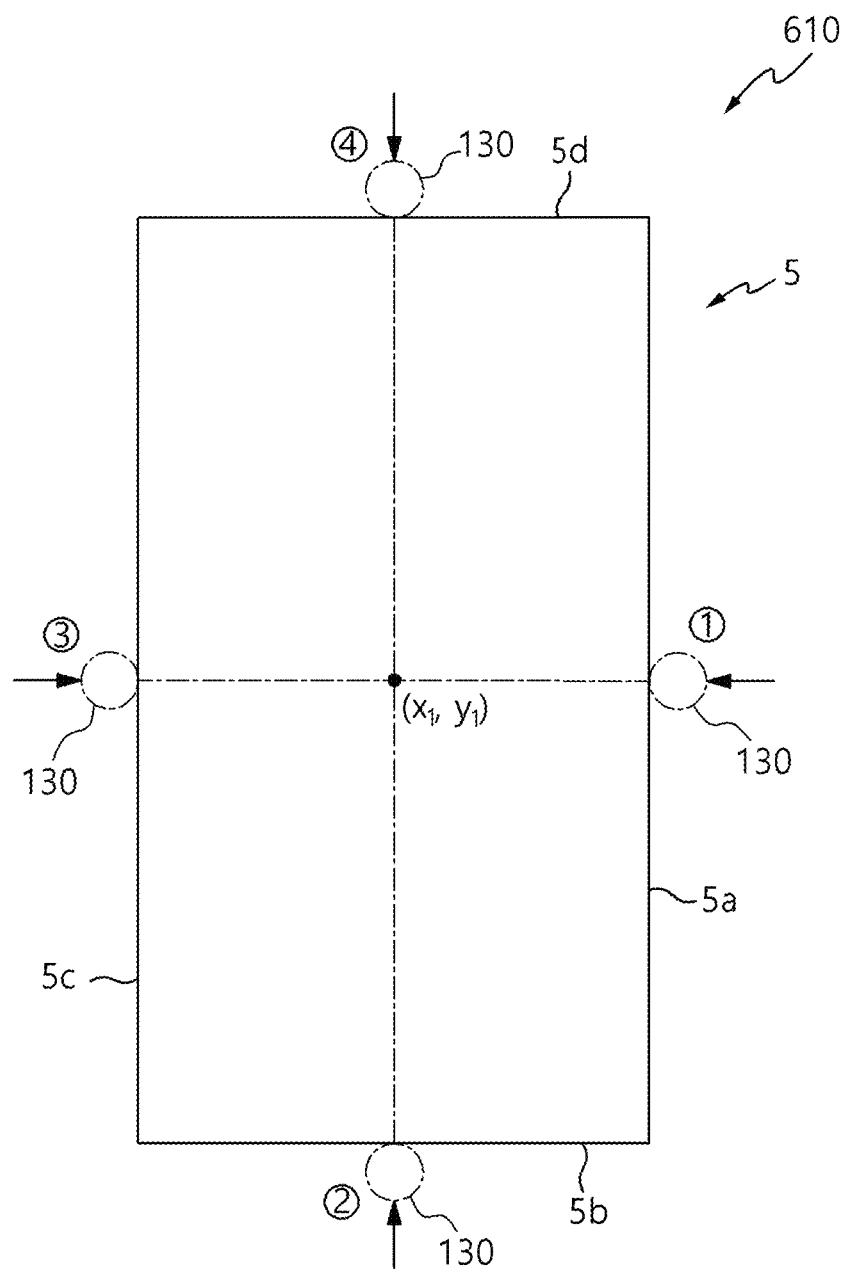
FIG. 7 is a reference view illustrating derivation of a center point of a jig by a jig center point derivation module illustrated in FIG. 6.

FIG. 7 is a reference view illustrating derivation of a center point of the jig 5 by the jig center point derivation module 610 illustrated in FIG. 6.

Referring to FIGS. 4, 6, and 7, the jig center point derivation module 610 may a module that derives the center point of the jig 5 by controlling the processing member 130 to be brought into contact with a plurality of side wall portions 5a to 5d of the jig 5. For example, when the jig 5 is formed in a substantially rectangular plate shape, the jig center point derivation module 610 may control the processing member 130 to be brought into contact with all four side wall portions 5a to 5d of the jig 5. Here, the same processing point C of the processing member 130 may be brought into contact with the side wall portions 5a to 5d of the jig 5.

For example, the processing member 130 may be brought into contact with a first side wall portion 5a of the jig 5, and rotated by 90° to be brought into contact with a second side wall portion 5b of the jig 5. In addition, the processing member 130 may be further rotated by 90° in the same direction to be brought into contact with a third side wall portion 5c of the jig 5, and further rotated by 90° in the same direction to be brought into contact with a fourth side wall portion 5d. Here, the contact order for the first to fourth side wall portions 5a to 5d may be changed. For example, the processing member 130 may be brought into contact with the first side wall portion 5a and then with the third side wall portion 5c.

As described above, by allowing only the same processing point C of the processing member 130 to make contact with the jig 5, coordinate values $x_1$ and $y_1$ of the center point of the jig 5 can be accurately derived even when thermal deformation or the like occurs in the processing member 130. On the contrary, when a plurality of processing points C of the processing member 130 are brought into contact with the side wall portions 5a to 5d, respectively, in a state where thermal deformation occurs in the processing member 130, the outer surface of the processing member 130 may not have a uniform R value, so an accurate center point of the jig 5 cannot be derived.

In addition, for example, when the jig 5 has a substantially rectangular plate shape, the jig center point derivation module 610 may allow the processing point C of the processing member 130 to be brought into contact with the side wall portions 5a and 5c opposite to each other. Thereby, an x-coordinate value of the center point of the jig 5 may be derived. In addition, the jig center point derivation module 610 may allow the processing point C of the processing member 130 to be brought into contact with the remaining side wall portions 5b and 5d opposite to each other. Thereby, a y-coordinate value of the center point of the jig 5 may be derived. The detection part for deriving each contact position may be mounted on the apparatus 1 or on a side of a peripheral portion of the apparatus 1. The detection part may be, for example, an encoder, but is not limited thereto.

Here, the jig center point derivation module 610 may control the processing member 130 to be brought into contact with a longitudinal center of each of the side wall portions 5a to 5d, or to be brought into contact with an arbitrary position adjacent to each corner portion 53. However, the scope of the present disclosure is not limited to specific examples. Through the jig center point derivation module 610, the coordinate values $x_1$ and $y_1$ of the jig 5 may be obtained. The contact between the processing member 130 and the jig 5 by the jig center point derivation module 610 may be performed by a separate driving device/means that enables the movement of the uniform pressure control part 40 and the apparatus 1.

Figure 8:
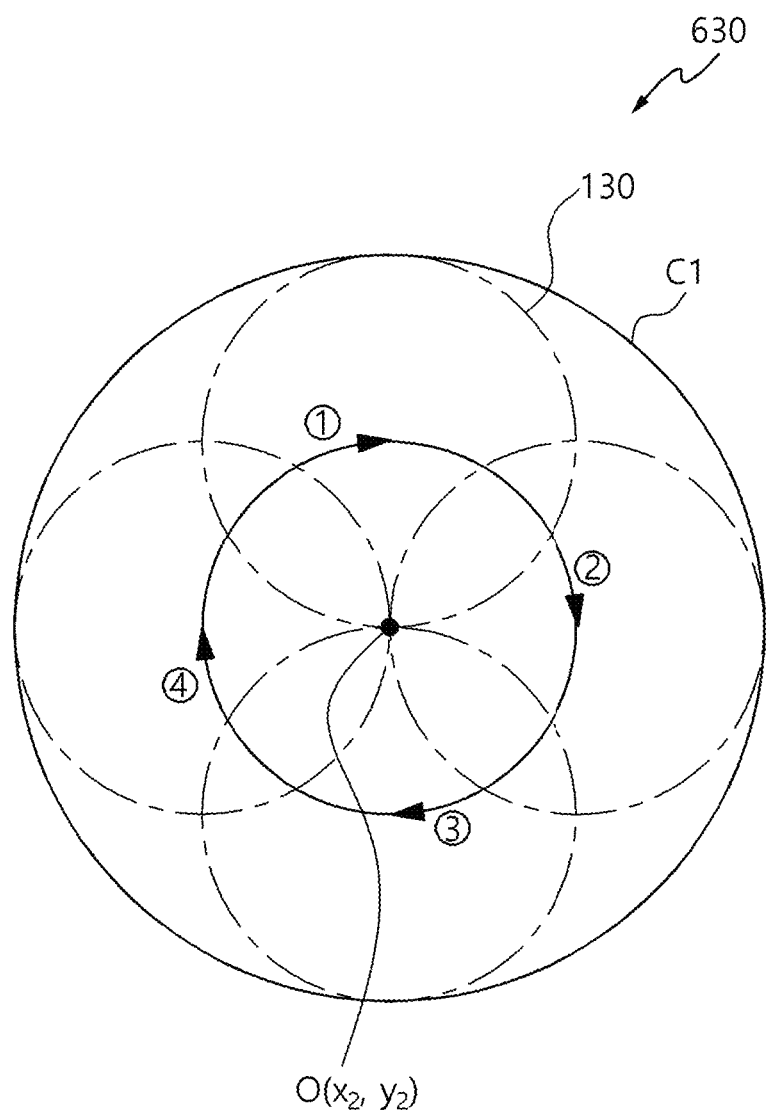
FIG. 8 is a reference view illustrating derivation of an origin point of a processing member by a processing member origin point derivation module illustrated in FIG. 6.

FIG. 8 is a reference view illustrating derivation of an origin point of the processing member 130 by the processing member origin point derivation 630 module illustrated in FIG. 6.

Referring to FIGS. 4, 6, and 8, the processing member origin point derivation module 630 may be a module that derives an origin point O of the processing member 130. As described above, the processing member 130 may be controlled such that only a single processing point C is brought into contact with the glass plate 3 during the heat chamfering process of the glass plate 3. Therefore, for example, when the glass plate 3 is rectangular, the processing member 130 may be moved on a first side wall portion along the processing direction, and then rotated by 90° along a corresponding corner portion 33 and moved on a second side wall portion along the processing direction. Thereafter, the processing member 130 may be rotated by 90° (accumulated angle of 180°) along another corner portion 33 and moved on a third side wall portion along the processing direction, and then rotated by 90° (accumulated angle of 270°) along a last corner portion 33 and moved on a fourth side wall portion along the processing direction. As described above, in the thin glass plate processing apparatus 1 according to the embodiment of the present disclosure, the processing member 130 may perform the heat chamfering process for the glass plate 3 in the processing orthogonal direction under control or driving of the uniform pressure control part 40.

Therefore, the processing member origin point derivation module 630 may derive the origin point O of the processing member 130 through the imaging part 50 by rotating the processing member 130 by 360° step by step from an initial position or a reference position. More specifically, the processing member 130 may be rotated by 90° in four steps, for example, from the original position by operation of the first driving means 250 and/or the second driving means 350. Then, a center point O of a circle C1 circumscribed with the processing member 130 at a position corresponding to each of the four steps. However, 90° rotation of the processing member 130 is exemplified for convenience of description, and the processing member 130 may be rotated by 360° step by step at a predetermined angle. For example, the processing member 130 may be rotated by each 600 in six steps. By deriving the origin point O of the processing member 130 in this manner, the path of the processing member 130 for the heat chamfering process can be precisely set. Thereby, coordinate values $x_2$ and $y_2$ of the origin point O of the processing member 130 may be derived. Since the origin point coordinate values are coordinate values for the reference position of the processing member 130, they may also be referred to as reference coordinate values.

Referring to FIGS. 4 and 6, the path setting module 650 may be a module that sets the processing path of the processing member 130 by utilizing the coordinate values $x_1$ and $y_1$ of the center point of the jig and the coordinate values $x_2$ and $y_2$ of the origin point O of the processing member 130. For example, the processing path of the processing member 130 may be set on the basis of the coordinate values $x_1$ and $y_1$ of the center point of the jig 5, the coordinate values $x_2$ and $y_2$ of the origin point O of the processing member 130, and the lengths of the long and short axes of the glass plate 3.

Figure 9:
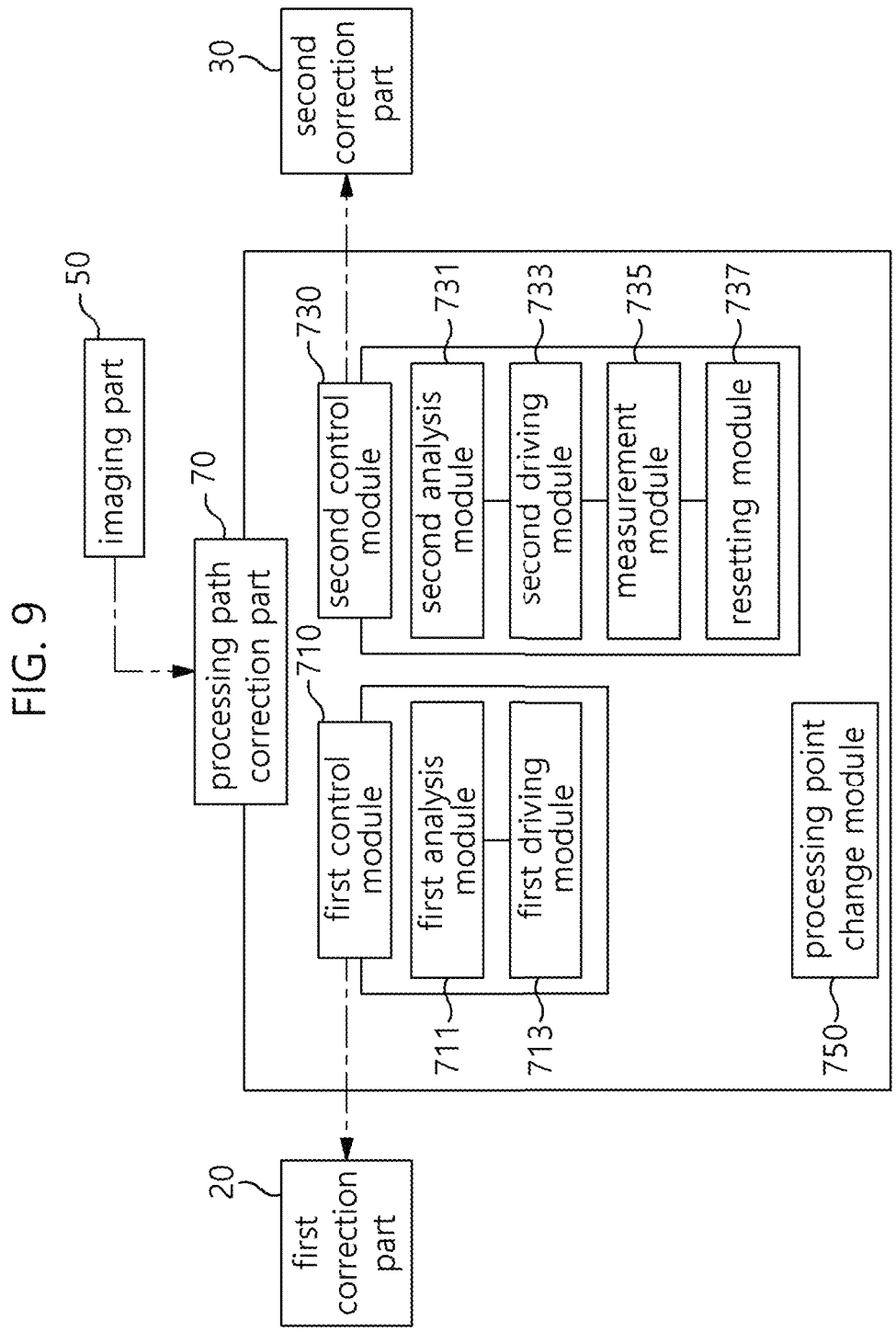
FIG. 9 is a block diagram illustrating a processing path correction part illustrated in FIG. 4.

FIG. 9 is a block diagram illustrating the processing path correction part 70 illustrated in FIG. 4.

Referring to FIGS. 4 and 9, the processing path correction part 70 may correct the position of the heating part 10, particularly the processing member 130 by controlling the first correction part 20 and/or the second correction part 30. Specifically, the processing path correction part 70 may control driving of the correction parts 20 and/or 30 by analyzing photographing information from the imaging part 50.

To this end, the processing path correction part 70 may include a first control module 710, a second control module 730, and a processing point change module 750.

Figure 10:
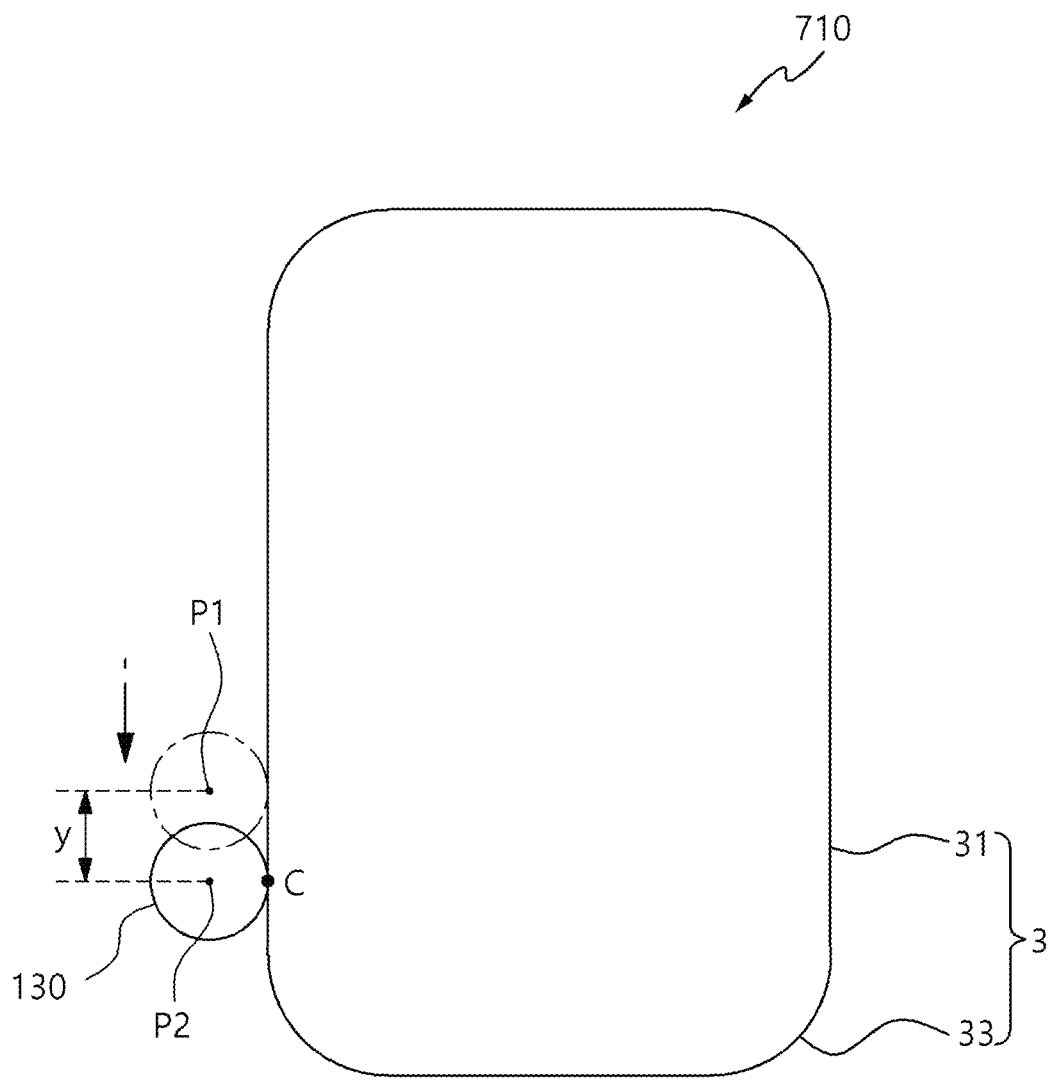
FIG. 10 is a reference view illustrating alignment of a processing member in a processing direction by a first control module illustrated in FIG. 9.

FIG. 10 is a reference view illustrating alignment of the processing member 130 in the processing direction by the first control module 710 illustrated in FIG. 9.

Referring to FIGS. 4, 9, and 10, the first control module 710 may be a module that controls driving of the first correction part 20 by analyzing the position of the processing member 130 in the processing direction on the basis of the photographing information from the imaging part 50. To this end, the first control module 710 may include: a first analysis module 711 deriving a distance or coordinate value between a prestored reference center point P2 and a current center point P1 of the processing member 130 in the processing direction; and a first driving module 713 controlling driving of the first correction part 20 on the basis of the distance or coordinate value derived by the first analysis module 711. The current center point P1 may be specified as, for example, a center position between the processing point C of the processing member 130 and a point opposite to the processing point C.

Figure 11:
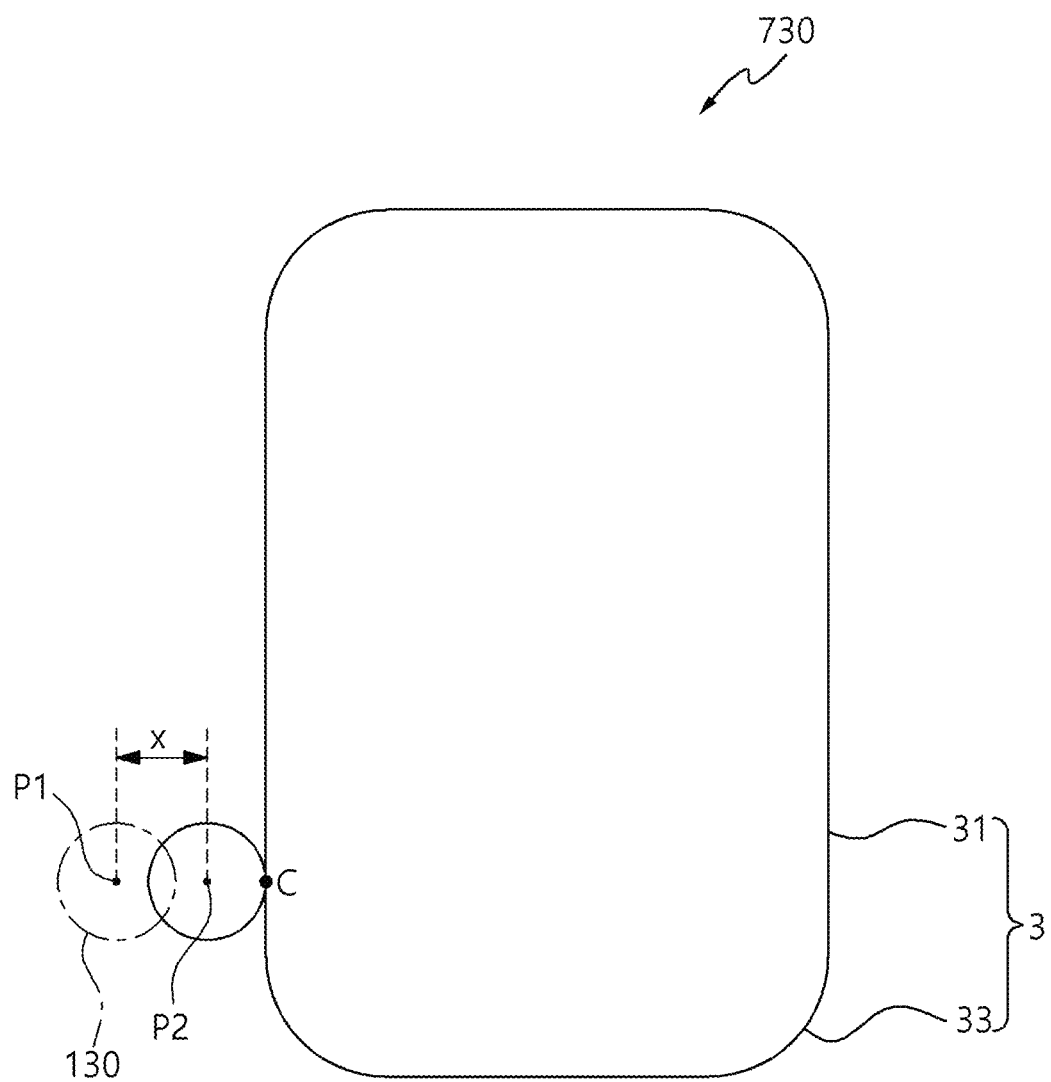
FIG. 11 is a reference view illustrating alignment of the processing member in a processing orthogonal direction by a second control module illustrated in FIG. 9.

FIG. 11 is a reference view illustrating alignment of the processing member 130 in the processing orthogonal direction by the second control module 730 illustrated in FIG. 9.

Referring to FIGS. 4, 9, and 11, the second control module 730 may be a module that controls driving of the second correction part 30 by analyzing the position of the processing member 130 in the processing orthogonal direction on the basis of the photographing information from the imaging part 50. To this end, the second control module 730 may include: a second analysis module 731 deriving a distance or coordinate value between the prestored reference center point P2 and the current center point P1 of the processing member 130 in the processing orthogonal direction; and a second driving module 733 controlling driving of the second correction part 30 on the basis of the distance or coordinate value derived by the second analysis module 731.

Figure 12:
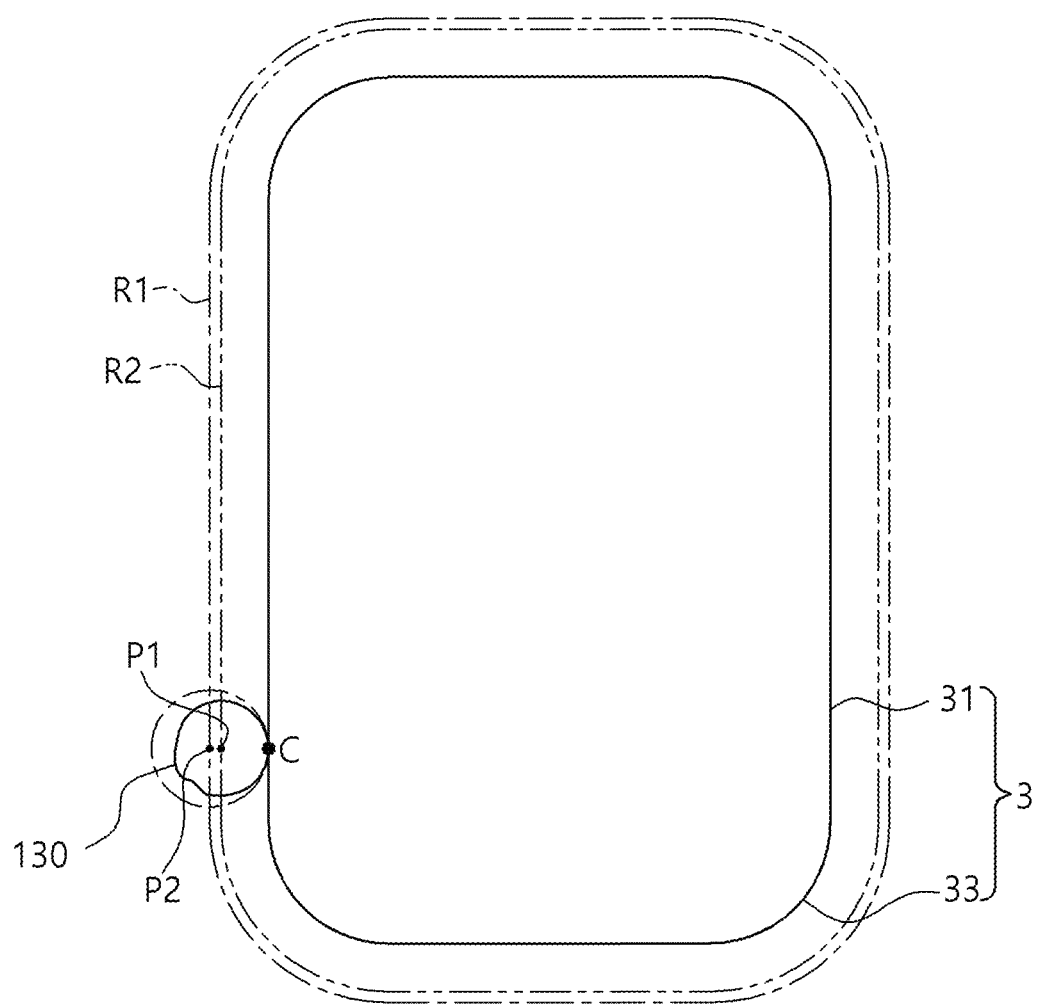
FIG. 12 is a reference view illustrating resetting of a new processing path by a measurement module and a resetting module illustrated in FIG. 9.

FIG. 12 is a reference view illustrating resetting of a new processing path by a measurement module 735 and a resetting module 737 illustrated in FIG. 9.

Referring to FIGS. 4, 9, and 12, the second control module 730 may further include: the measurement module 735 measuring a distance from the processing point C or the current center point P1 of the processing member 130 to the reference center point P2 in the processing orthogonal direction; and the resetting module 737 resetting a prestored processing path R1 into a new processing path R2 on the basis of the distance measured by the measurement module 735.

As described above, the position of the processing member 130 in the processing direction and/or the processing orthogonal direction may be corrected by the first control module 710 and/or the second control module 730, so occurrence of defective processing of the glass plate 3 can be prevented. In addition, an accurate processing path R2 can be provided by the measurement module 735 and the resetting module 737 even when thermal deformation occurs in the processing member 130.

The processing point change module 750 may be a module that changes a previous processing point C to a new processing point when the processing point C of the processing member 130 is worn or damaged due to a plurality of processing or chamfering operations. For example, the processing point change module 750 may set the new processing point when a preset number of processing operations are performed. The new processing point may be set through height adjustment and/or lateral rotation of the processing member 130, but the scope of the present disclosure is not limited thereto.

Figure 13:
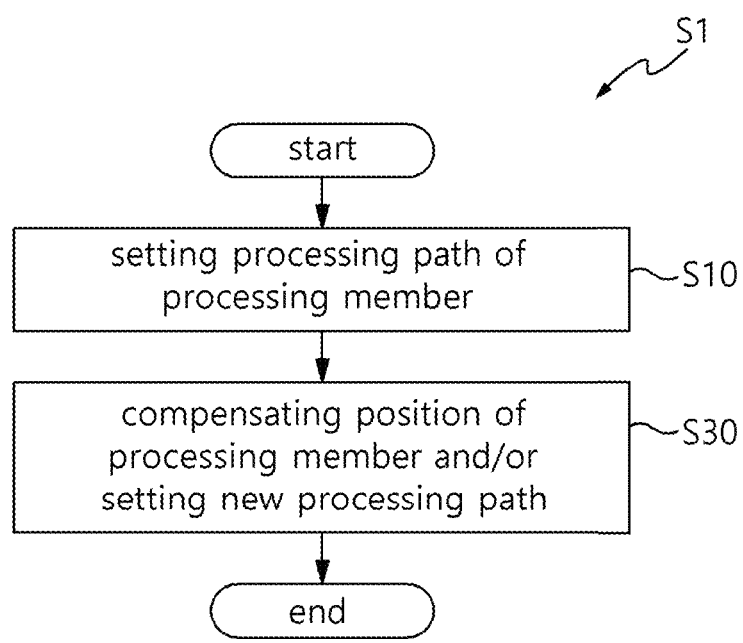
FIG. 13 is a flowchart illustrating a thin glass plate processing method according to an embodiment of the present disclosure.
Figure 14:
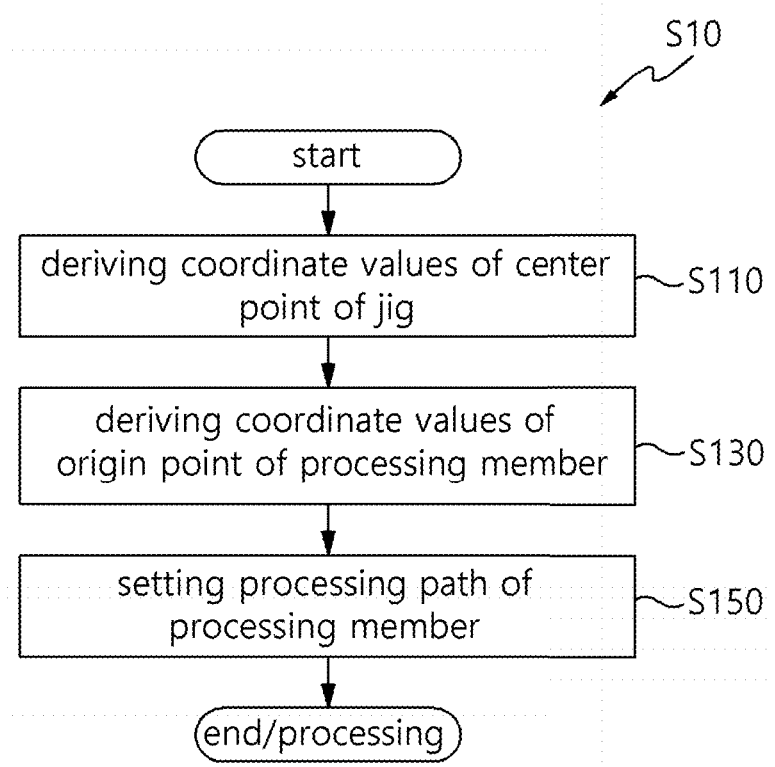
FIG. 14 is a flowchart illustrating step S10 illustrated in FIG. 13.

FIG. 13 is a flowchart illustrating a thin glass plate processing method according to an embodiment of the present disclosure; FIG. 14 is a flowchart illustrating step S10 illustrated in FIG. 13; and FIG. 15 is a flowchart illustrating step S30 illustrated in FIG. 13.

Hereinafter, the thin glass plate processing method Si according to the embodiment of the present disclosure will be described in detail with reference to the accompanying drawings. Since the following processing method is performed through the above-described thin glass plate processing apparatus 1, detailed redundant descriptions will be omitted. In addition, each step may be performed in an order different from that illustrated, but the scope of the present disclosure is not limited thereto.

A processing operation for side wall portions 31 and corner portions 33 of a glass plate 3 placed on a jig 5 may be performed through the thin glass plate processing apparatus 1 according to the embodiment of the present disclosure.

Here, referring to FIG. 13, first, a processing path of a processing member 130 may be set (S10). Then, during a heat chamfering operation, if necessary, the position of the processing member 130 may be compensated and/or a previous processing path R1 may be replaced with a new processing path R2 (S30).

From now on, step S10 will be described in detail.

Describing step S10 with reference to FIGS. 13 and 14, first, coordinate values $x_1$ and $y_1$ of a center point of the jig 5 may be derived (S110). Step S110 may be performed through a jig center point derivation module 610. For example, the coordinate values $x_1$ and $y_1$ of the center point of the jig 5 may be derived by allowing the processing member 130 to be brought into contact with a plurality of side wall portions 51 of the jig 5. As described above, when the jig 5 is formed in a substantially rectangular plate shape, the jig center point derivation module 610 may derive the coordinate values $x_1$ and $y_1$ by controlling the processing member 130 to be brought into contact with all four side wall portions 51 of the jig 5. Here, it is preferable that the contact point of the processing member 130 with each of the side wall portions 51 of the jig 5 is a single processing point C.

Then, or prior to step S110, an origin point O of the processing member 130 may be derived (S130). Step S130 may be performed through a processing member origin point derivation module 630. In step S130, for example, the processing member 130 may be rotated by 360° step by step along a preset angle range from an initial position of the processing member 130 to derive a circle C1 circumscribed with the processing member 130 for each step, and then coordinate values $x_2$ and $y_2$ of the origin point O of the processing member 130 may be calculated by deriving a center point O of the circle C1.

Then, the processing path of the processing member 130 may be set on the basis of the coordinate values $x_1$ and $y_1$ of the center point of the jig 5 and the coordinate values $x_2$ and $y_2$ of the origin point O of the processing member 130 (S150). Step S150 may be performed through a path setting module 650. For example, the processing path of the processing member 130 may be set on the basis of the coordinate values $x_1$ and $y_1$ of the center point of the jig 5 and the coordinate values $x_2$ and $y_2$ of a center point P1 of the horizontal cross-section of the processing member 130.

From now on, step S30 will be described in detail.

Referring to FIGS. 13 and 15, first, a controller may measure whether a current center point P1 of the processing member 130 is deviated from a prestored reference center point P2 and the degree of deviation. Specifically, for example, the center point P1 of the cross-section of the processing member 130 may be specified as a center position between a processing point C of the processing member 130 and a point opposite to the processing point C on the basis of photographing information from an imaging part 50. Then, it may be checked whether the center point P1 is deviated from the reference center point P2 (S330). This may be performed through a first analysis module 711 and a second analysis module 731.

Then, in the case of control in the processing orthogonal direction, the distance from the processing point C or the current center point P1 of the processing member 130 to the reference center point P2 may be measured through a measurement module 735, and the processing path R1 may be reset to the new processing path R2 through a resetting module 737 (S350). Then, driving of a first correction part 20 and a second correction part 30 and the degree of rotation of shaft members 210 and 310 may be controlled through a first driving module 713 and a second driving module 733 in order to reset the current center point P1 of the processing member 130 (S370). Steps S350 and S370 may be performed independently of steps S310 and S330 or may be performed prior to steps S310 and S330, if necessary, but the scope of the present disclosure is not limited thereto.

By step S30, the processing path R2 of the processing member 130 may be reset and the reference center point P2 and the current center point P1 may be matched, so processing defects of the glass plate 3 due to tilting and positional deviation of the processing member 130 can be prevented. In particular, processing defects for the corner portions 33 that are processed in a round shape other than the side wall portions 31 extending substantially straight can be prevented.

The foregoing detailed description may be merely an example of the present disclosure. Also, the inventive concept is explained by describing the preferred embodiments and will be used through various combinations, modifications, and environments. That is, the inventive concept may be amended or modified without departing from the scope of the technical idea and/or knowledge in the art. The foregoing embodiments are for illustrating the best mode for implementing the technical idea of the present disclosure, and various modifications may be made therein according to specific application fields and uses of the present disclosure. Therefore, the foregoing detailed description of the present disclosure is not intended to limit the inventive concept to the disclosed embodiments.

What is claimed is:

1. A thin glass plate processing apparatus comprising:
   a heating part configured to heat-chamfer side wall portions and/or corner portions of a glass plate on a jig as at least a side thereof is heated;
   a uniform pressure control part configured to move the heating part adjacent to the glass plate along a processing orthogonal direction so that the heating part heat-chamfers the side wall portions and/or the corner portions of the glass plate while pressing the side wall portions and/or the corner portions with a substantially uniform pressure, the uniform pressure control part including a voice coil motor (VCM);
   an imaging part configured to photograph a side of a processing member, the imaging part including a vision camera;
   a first correction part configured to align the processing member along a processing direction, the first correction part including a first moving plate member and a first elastic member disposed along the processing direction; and
   a second correction part configured to align the processing member along the processing orthogonal direction, the second correction part including a second moving plate member and a second elastic member disposed along the processing orthogonal direction,
   wherein the heating part comprises:
   a body portion configured to fix the processing member to a lower side thereof, the body portion having a first rod-shaped body; and
   the processing member configured to heat-chamfer the glass plate in contact with the side wall portions and/or the corner portions of the adjacent glass plate by being heated by a high-frequency induction heater, the processing member having a second rod-shaped body, and
   wherein only a single processing point of the processing member is configured to be brought into contact with the side wall portions and/or the corner portions of the glass plate.

2. The thin glass plate processing apparatus of claim 1, further comprising;
   at least one controller configured to set a processing path of the processing member to perform heat chamfering on the glass plate on the jig,
   wherein the least one controller comprises:
   a jig center point derivation module configured to execute a first set of instructions to derive a center point of the jig by controlling the processing member to be brought into contact with a plurality of side wall portions of the jig;
   a processing member origin point derivation module configured to execute a second set of instructions to derive an origin point of the processing member; and
   a path setting module configured to execute a third set of instructions to set the processing path of the processing member.

3. The thin glass plate processing apparatus of claim 2, further comprising: a detection part configured to detect contact positions of the processing member and the plurality of side wall portions of the jig, wherein the jig center point derivation module is configured to derive an x coordinate value and a y coordinate value of the center point of the jig by controlling the processing member to be brought into contact with four side wall portions of the jig having a substantially rectangular plate shape.

4. The thin glass plate processing apparatus of claim 3, wherein the jig center point derivation module is configured to control only the single processing point of the processing member to be brought into contact with the side wall portions of the jig.

5. The thin glass plate processing apparatus of claim 2, wherein the processing member origin point derivation module is configured to derive the origin point of the processing member by rotating the processing member by 3600 step by step from an initial position of the processing member and deriving a center point of a circle circumscribed with the processing member at a position corresponding to each step.

6. The thin glass plate processing apparatus of claim 2, wherein the at least one controller is further configured to correct a processing path of the processing member by controlling the first correction part and/or the second correction part, wherein the at least one controller comprises a first control module configured to control driving of the first correction part by analyzing a position of the processing member in the processing direction on a basis of photographing information from the imaging part, and wherein the first control module comprises: a first analysis module configured to execute a fourth set of instructions to derive a distance between a prestored reference center point and a current center point of the processing member in the processing direction; and a first driving module configured to execute a fifth set of instructions to control driving of the first correction part on a basis of the distance derived by the first analysis module.

7. The thin glass plate processing apparatus of claim 2, wherein the current center point is derived as a center position between the processing point of the processing member and a point opposite to the processing point.

8. The thin glass plate processing apparatus of claim 7, wherein the least one controller comprises a second control module configured to control driving of the second correction part by analyzing a position of the processing member in the processing orthogonal direction on the basis of the photographing information from the imaging part, and wherein the second control module comprises: a second analysis module configured to execute a sixth set of instructions to derive a distance between the prestored reference center point and the current center point of the processing member in the processing orthogonal direction; and a second driving module configured to execute a seventh set of instructions to control driving of the second correction part on the basis of the distance derived by the second analysis module.

9. The thin glass plate processing apparatus of claim 8, wherein the second control module further comprises: a measurement module configured to execute an eighth set of instructions to measure a distance from the processing point of the processing member to the prestored reference center point; and a resetting module configured to execute a ninth set of instructions to reset a prestored processing path into a new processing path on a basis of the distance measured by the measurement module.

10. The thin glass plate processing apparatus of claim 8, wherein the at least one controller further comprises a processing point change module configured to execute a tenth set of instructions to change a previous processing point to a new processing point when the processing point of the processing member is worn or damaged due to a plurality of processing operations, and wherein the new processing point is set through height adjustment and/or lateral rotation of the processing member.

11. The thin glass plate processing apparatus of claim 1, wherein the first correction part comprises: a first shaft member having a first end connected to a first driving means and a second end inserted into the first moving plate member, the first driving means including a motor; the first moving plate member configured to allow the second end of the first shaft member to be inserted therein and to be moved in the processing direction; and the first driving means connected to the first end of the first shaft member and configured to control rotation of the first shaft member, wherein the first shaft member comprises: a first extension portion connected to the first driving means and extending downward; and a first insertion portion inserted into the first moving plate member, wherein the first insertion portion is coupled to a lower portion of the first extension portion so as to be eccentric from a central axis of the first extension portion in a z-axis direction, and wherein the first moving plate member comprises a first insertion groove allowing the first insertion portion to be inserted therein.

12. A thin glass plate processing apparatus comprising:
a heating part configured to heat-chamfer side wall portions and/or corner portions of a glass plate on a jig as at least a side thereof is heated;
a uniform pressure control part configured to move the heating part adjacent to the glass plate along a processing orthogonal direction so that the heating part heat-chamfers the side wall portions and/or the corner portions of the glass plate while pressing the side wall portions and/or the corner portions with a substantially uniform pressure;
an imaging part configured to photograph a side of a processing member;
a first correction part configured to align the processing member along a processing direction; and
a second correction part configured to align the processing member along the processing orthogonal direction,
wherein the heating part comprises:
a body portion configured to fix the processing member to a lower side thereof; and
the processing member configured to heat-chamfer the glass plate in contact with the side wall portions and/or the corner portions of the adjacent glass plate by being heated by a high-frequency induction heater, and
wherein only a single processing point of the processing member is configured to be brought into contact with the side wall portions and/or the corner portions of the glass plate.

* * * * *